United States Patent
Mori

(10) Patent No.: US 9,477,914 B2
(45) Date of Patent: Oct. 25, 2016

(54) IMAGE PROCESSING APPARATUS, METHOD, AND MEDIUM FOR CONVERTING PAGE IMAGE DATA

(71) Applicant: CANON KABUSHIKI KAISHA, Tokyo (JP)

(72) Inventor: Hiroshi Mori, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/799,361

(22) Filed: Jul. 14, 2015

(65) Prior Publication Data

US 2015/0317550 A1 Nov. 5, 2015

Related U.S. Application Data

(63) Continuation of application No. 13/919,880, filed on Jun. 17, 2013, now Pat. No. 9,113,054.

(30) Foreign Application Priority Data

Jun. 20, 2012 (JP) .................................. 2012-138385

(51) Int. Cl.
*H04N 1/04* (2006.01)
*G06K 15/02* (2006.01)
(Continued)

(52) U.S. Cl.
CPC ............. *G06K 15/1886* (2013.01); *G06T 1/60* (2013.01); *H04N 1/21* (2013.01); *H04N 1/32475* (2013.01); *H04N 2201/0082* (2013.01); *H04N 2201/0094* (2013.01)

(58) Field of Classification Search
CPC ........ H04N 1/04; H04N 5/144; H04N 5/202; G03F 1/14; G03F 1/76; G03F 7/70291; G03F 7/70508; G06T 15/00; B41J 2/155; B41J 2/465; G02B 7/28; G03B 13/36; G08B 13/19636; G08B 13/19656; G08B 13/19663
USPC ................. 358/474, 488, 448, 3.01; 347/77; 382/266, 104, 190, 195, 199, 202, 209, 382/241, 289; 348/143, 149, 280, 294, 340, 348/349, 350, 362; 396/166, 180, 194
See application file for complete search history.

(56) References Cited

U.S. PATENT DOCUMENTS 4,513,390 A 4/1985 Walter et al.
5,270,728 A * 12/1993 Lund ...................... B41J 2/2052
347/107

(Continued)

FOREIGN PATENT DOCUMENTS

JP H09-277616 A 10/1997
JP H10-071750 A 3/1998
(Continued)

*Primary Examiner* — Negussie Worku
(74) *Attorney, Agent, or Firm* — Canon USA, Inc. IP Division

(57) ABSTRACT

An image processing apparatus including a memory includes a first conversion method configured to perform conversion processing for converting an image represented by span information in page line sequence into span information in tile sequence, using the memory; a second conversion unit configured to perform conversion processing for converting an image represented by pixel information in page line sequence into pixel information in tile sequence, using the memory; and a control unit configured to control a conversion unit employing a less usage amount of the memory used in a case that a process target image is converted into tiles, of the first conversion unit and the second conversion unit, to perform the conversion processing on the process target image.

9 Claims, 14 Drawing Sheets

(51) Int. Cl.
*H04N 1/21* (2006.01)
*H04N 1/32* (2006.01)
*G06T 1/60* (2006.01)

(56) References Cited

U.S. PATENT DOCUMENTS

| | | | | |
|---|---|---|---|---|
| 5,987,227 | A * | 11/1999 | Endo | H04N 1/00002 358/1.13 |
| 6,226,102 | B1 * | 5/2001 | Koike | H04N 1/0096 358/1.9 |
| 8,033,630 | B2 * | 10/2011 | Miyamoto | B41J 2/2139 347/12 |
| 8,107,123 | B2 | 1/2012 | Ono et al. | |
| 8,284,218 | B2 | 10/2012 | Yoshida | |
| 8,351,086 | B2 * | 1/2013 | Mori | G06K 15/02 235/487 |
| 8,705,137 | B2 | 4/2014 | Zaima | |
| 9,113,054 | B2 * | 8/2015 | Mori | H04N 1/21 |
| 2003/0174180 | A1 * | 9/2003 | Nunokawa | B41J 2/1752 347/5 |
| 2004/0047510 | A1 | 3/2004 | Kawabata | |
| 2005/0151996 | A1 * | 7/2005 | Koike | H04N 1/00811 358/1.15 |
| 2005/0185012 | A1 * | 8/2005 | Yoshida | B41J 29/393 347/19 |
| 2006/0244751 | A1 | 11/2006 | Kitora | |
| 2006/0256123 | A1 * | 11/2006 | Miyagi | H04N 1/6022 345/581 |
| 2007/0086025 | A1 * | 4/2007 | Yoshida | H04N 1/00002 358/1.4 |
| 2009/0279131 | A1 * | 11/2009 | Matsui | H04N 1/46 358/1.15 |
| 2011/0123127 | A1 * | 5/2011 | Mima | H04N 19/46 382/239 |
| 2013/0100498 | A1 * | 4/2013 | Mori | G06K 15/1857 358/1.15 |
| 2013/0342873 | A1 * | 12/2013 | Mori | H04N 1/21 358/1.16 |

FOREIGN PATENT DOCUMENTS

| | | |
|---|---|---|
| JP | H11-147333 A | 6/1999 |
| JP | 2009-269355 A | 11/2009 |

* cited by examiner

PAGE IMAGE CONCEPTUAL ILLUSTRATION

*200* PAGE

DATA-SEQUENCE (PAGE-LINE SEQUENCE) CONCEPTUAL ILLUSTRATION

*200* PAGE

TILE DIVISION CONCEPTUAL ILLUSTRATION

*200* PAGE

DATA-SEQUENCE (TILE-SEQUENCE) CONCEPTUAL ILLUSTRATION

*200* PAGE

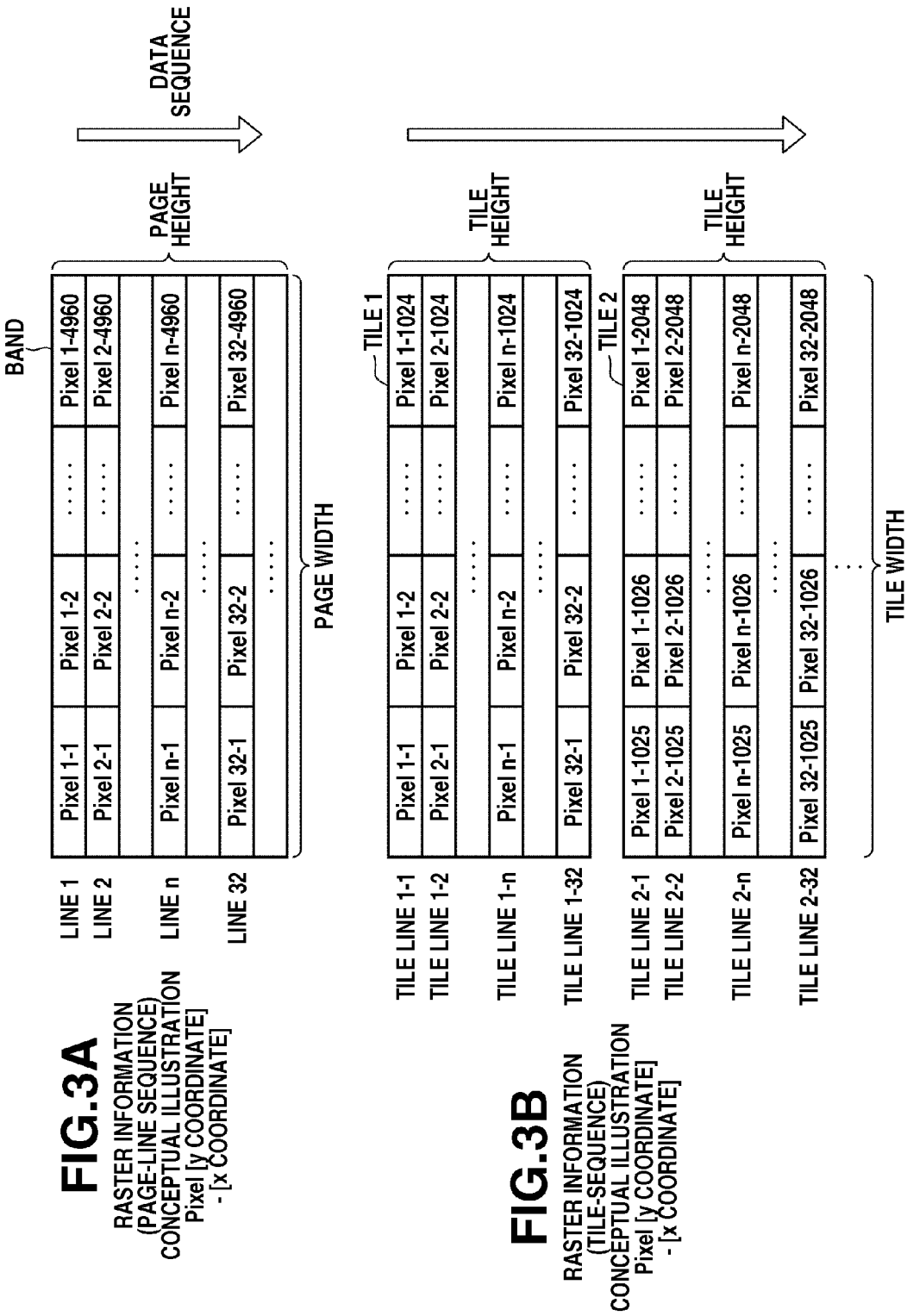

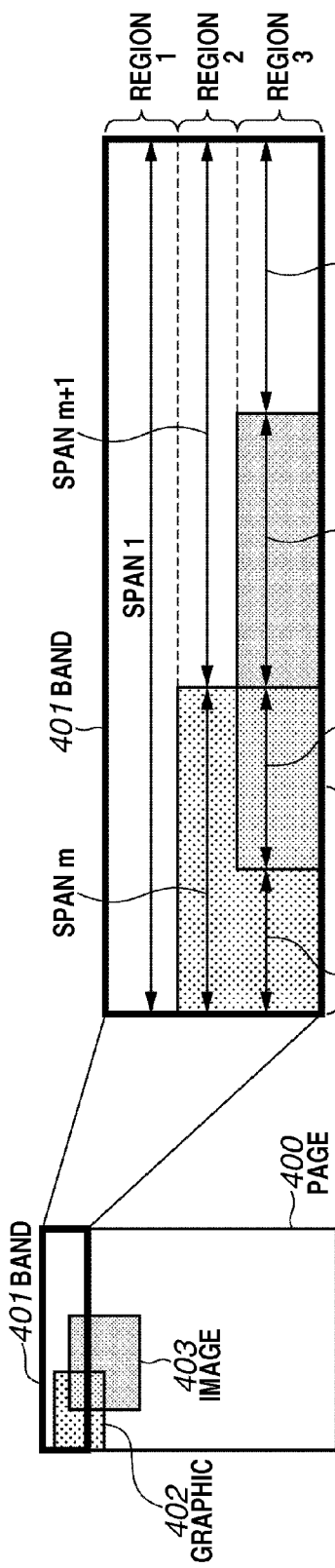
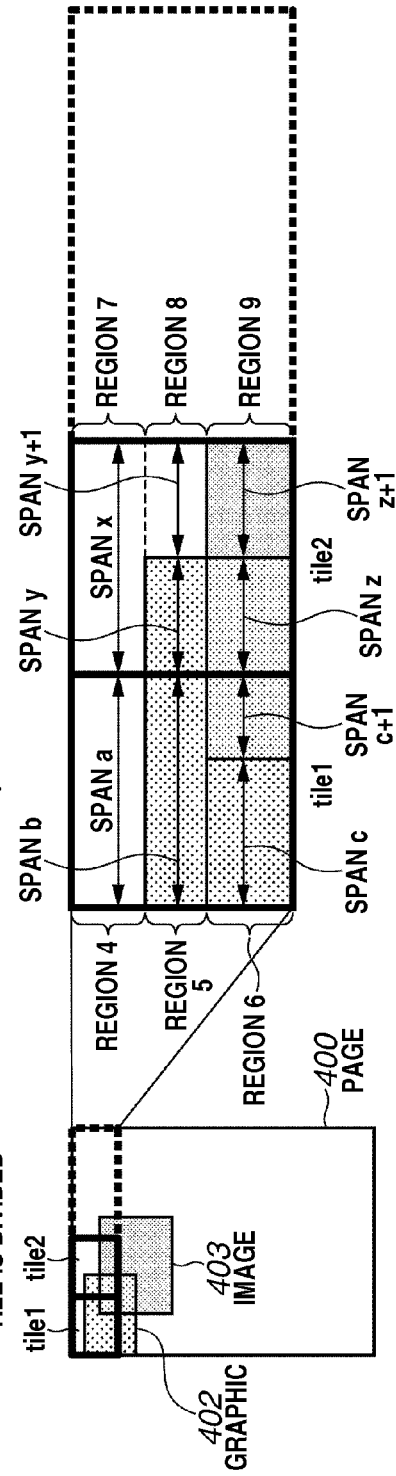
FIG.4A
OBJECT CONCEPTUAL ILLUSTRATION IN PAGE
FIG.4B
OBJECT CONCEPTUAL ILLUSTRATION WHEN TILE IS DIVIDED

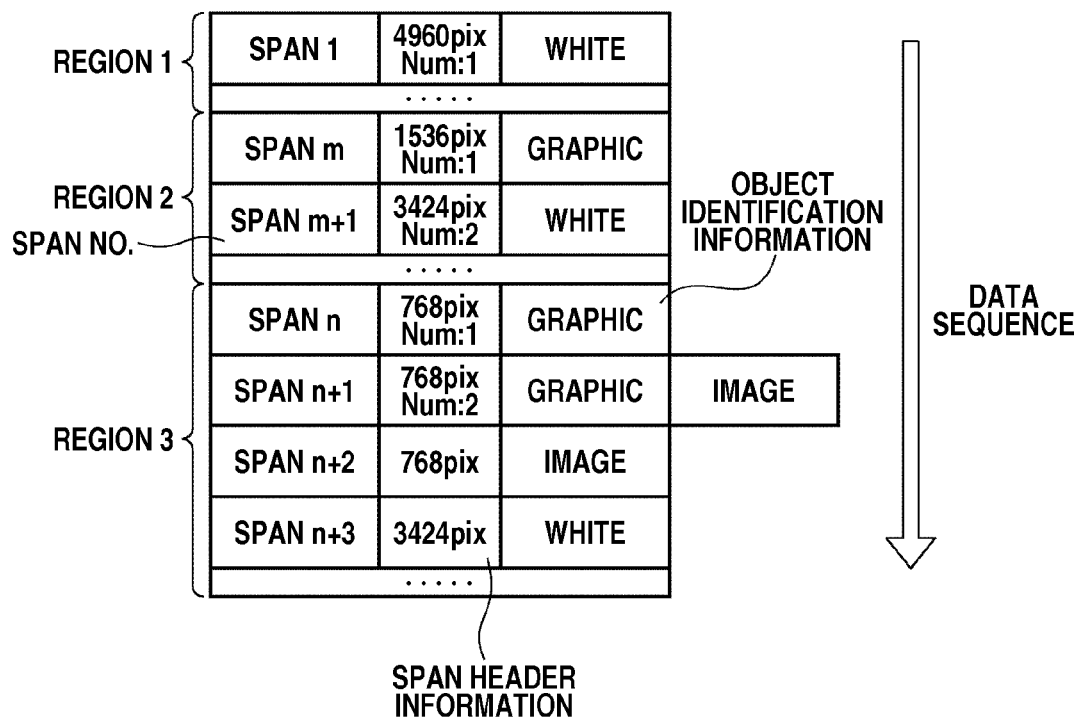

SPAN INFORMATION (TILE-SEQUENCE) CONCEPTUAL ILLUSTRATION

OBJECT DISTRIBUTION TABLE 910

| REGION | THE NUMBER OF OBJECTS | TILE-SEQUENCE CONVERSION METHOD |
|---|---|---|
| BAND REGION 1 (0 ≤ Y ≤ 31) | 1 | VECTOR METHOD |
| BAND REGION 2 (32 ≤ Y ≤ 63) | 1 | VECTOR METHOD |
| BAND REGION 3 (64 ≤ Y ≤ 95) | 0 | RASTER METHOD |
| ..... | | |
| BAND REGION N (6944 ≤ Y ≤ 6968) | 0 | RASTER METHOD |

IMAGE PROCESSING APPARATUS, METHOD, AND MEDIUM FOR CONVERTING PAGE IMAGE DATA

CROSS REFERENCE TO RELATED APPLICATIONS

The present application is a Continuation of U.S. patent application Ser. No. 13/919,880 filed Jun. 17, 2013, which claims the benefit of priority from Japanese Patent Application No. 2012-138385 filed Jun. 20, 2012, each of which is hereby incorporated by reference herein in their entirety.

BACKGROUND OF THE INVENTION

1. Field of the Invention

The present invention generally relates to image processing and, more particularly, to an image processing apparatus, a method thereof, and storage medium, and particularly to a technique for converting page image data into the page image data in tile sequence.

2. Description of the Related Art

For image forming processing, there has been a conventional technique for converting image data into image data for each rectangular tile, and then printing the image data at high speed by performing subsequent image processing in a tile unit in parallel. Processing for converting the image data into the image data for each tile is referred to as tile-sequence conversion processing. The tile sequence conversion processing is performed by inputting the image data into a work buffer in a page line sequence, and dividing the image data buffered at a predetermined tile height, into the image data of each tile, and then outputting the image data in tile sequence. Thus, in the tile sequence conversion processing, the image data needs to be temporarily stored in the work buffer and therefore, a predetermined buffer size is required.

Japanese Patent Application Laid-Open No. 2009-269355 discusses a technique for reducing a required buffer size by storing in the work buffer the image data in a vector format before the image data is rasterized instead of a raster format after the image data is rasterized, and then performing the tile sequence conversion processing on the image data in the vector format.

However, when the tile sequence conversion processing described in Japanese Patent Application Laid-Open No. 2009-269355 is performed on the image data in the vector format, for a page image including a great number of objects, the required memory size of the work buffer may be significantly increased.

SUMMARY OF THE INVENTION

The present disclosure is directed to tile sequence conversion processing capable of preventing a significant increase of a memory size caused by content of a page image.

An image processing apparatus including a memory includes a first conversion method configured to perform conversion processing for converting an image represented by span information in page line sequence into span information in tile sequence, using the memory, a second conversion unit configured to perform conversion processing for converting an image represented by pixel information in page line sequence into pixel information in tile sequence, using the memory, and a control unit configured to control a conversion unit employing a less usage amount of the memory used in a case that a process target image is converted into tiles, of the first conversion unit and the second conversion unit, to perform the conversion processing on the process target image.

Further features and aspects of the present disclosure will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the disclosure and, together with the description, serve to explain the principles of the disclosure.

FIGS. 3A and 3B are conceptual diagrams illustrating examples of data formats of raster information in page line sequence and in tile sequence.

FIGS. 4A and 4B are conceptual diagrams illustrating examples of span information included in a page.

FIGS. 5A and 5B are conceptual diagrams illustrating examples of data formats of span information in page line sequence and in tile sequence.

DESCRIPTION OF THE EMBODIMENTS

Various exemplary embodiments, features, and aspects of the disclosure will be described in detail below with reference to the drawings.

An image processing apparatus 100 according to a first exemplary embodiment is a multi-function peripheral (MFP). However, the present disclosure is not limited to the MFP, and a single function printer (SFP) and a laser beam printer (LBP), an ink jet printer, and other types of printers may also be adopted.

<Hardware Configuration of Image Processing Apparatus>

Figure 1:
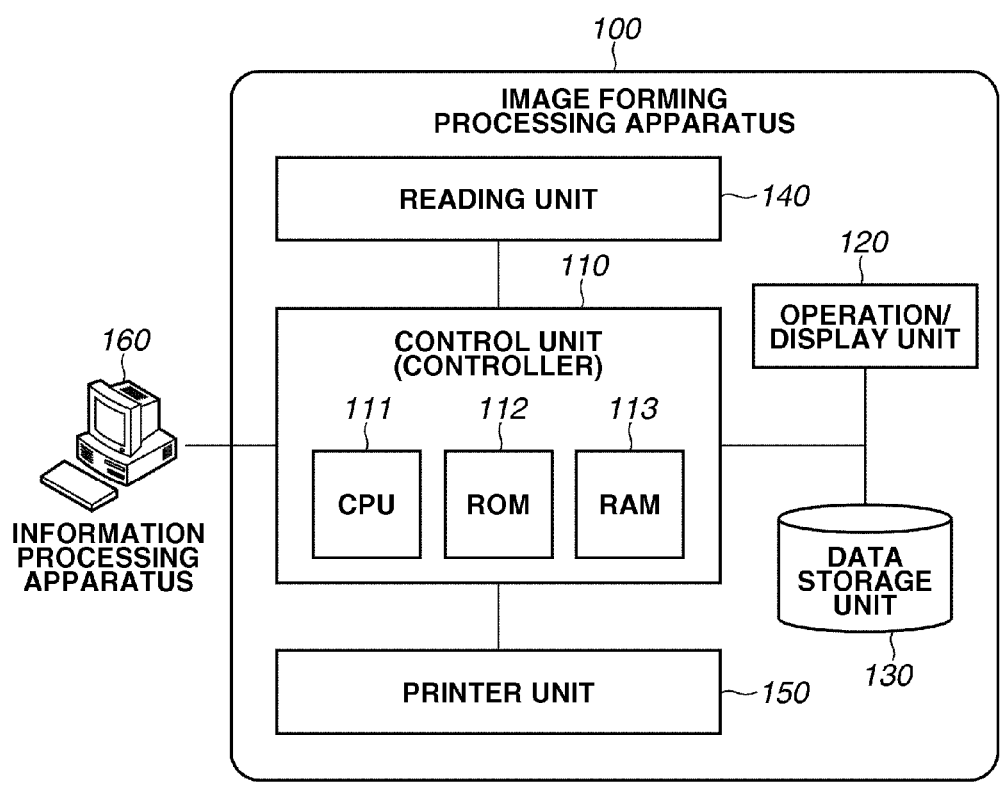
FIG. 1 is a block diagram illustrating an exemplary embodiment of an image processing apparatus.

FIG. 1 is a block diagram illustrating an exemplary embodiment of the image processing apparatus 100. The image processing apparatus 100 is connected to an information processing apparatus 160, which is a host computer, via a local area network (LAN) such as Ethernet. The image processing apparatus 100 includes a reader unit 140, a printer unit 150, an operation/display unit 120, a data storage unit 130, and further a control unit (controller) 110 for controlling each component element thereof.

Figure 7:
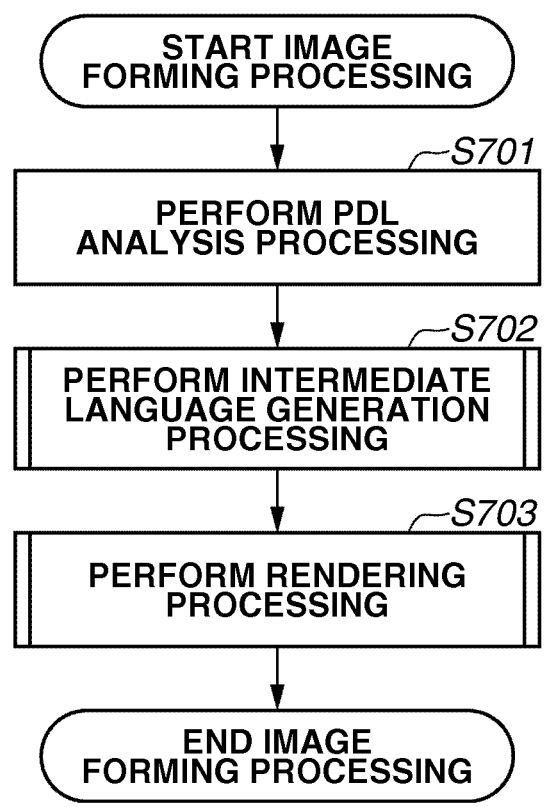
FIG. 7 is a series of processing flow of image forming processing performed on a page image by an image processing apparatus.

The control unit 110 includes a central processing unit (CPU) 111, a read only memory (ROM) 112, and a random access memory (RAM) 113. Based on a program stored in the ROM 112 or other storage media, the CPU 111 performs control processing on entire image processing apparatus 100 and image forming processing on a page image according to an instruction for image formation. With reference to FIG. 7, the image forming processing will be described below. The RAM 113 functions as a work buffer temporarily storing an image in a band region. The image in the band region refers to a divided image, which is acquired by dividing the page image, when rendering processing is performed on the page image, into a plurality of regions (band regions) in a division unit having a predetermined size. The work buffer may be simply referred to as a memory. The image referred to below may indicate not only an image as concept but also the image data as data. As used herein, the term "unit" generally refers to any combination of software, firmware, hardware, or other component that is used to effectuate a purpose.

An operation/display unit 120 includes a keyboard for operating various types of print setting for performing the image forming processing on a print job (print data) and a liquid crystal panel displaying an operation button for performing print setting. Types of items include "color setting", "print resolution setting", "paper size setting", and "page orientation setting". The "color setting" is made to indicate whether, for example, a four-color image in cyan, magenta, yellow, and black (CMYK) is to be generated by the image forming processing, or a monochrome image is to be generated. The "print resolution setting" sets resolution of the image generated by the image forming processing. The "paper size setting" sets a size of paper on which the image generated by the image forming processing is printed. The "page orientation setting" sets an orientation of the paper when the image generated by the image forming processing is printed. As will be described in detail below, the printing setting influences an amount of the memory used as the work buffer in the tile sequence conversion processing.

The printer unit 150 receives the image data from the control unit 110 and prints the image data based on the various types of set print settings.

The data storage unit 130 can store/keep print data such as the image data, document data, and print data including a printing apparatus control language (e.g., Page Description Language (PDL)). For example, the data storage unit 130 can store/keep the image data, the document data, and the PDL data received from the information processing apparatus 160 via the LAN and the image data read by controlling the reader unit 140.

<Image Forming Processing by Image Processing Apparatus>

FIG. 7 is a series of flow of image forming processing performed on the image in a page unit (page image) by the image processing apparatus 100 according to the present exemplary embodiment, and is performed by the control unit 110. The CPU 111 loads the program for executing the processing illustrated in FIG. 7 from the ROM 112 to the RAM 113, and executes the program so that the control unit 110 performs the processing illustrated in FIG. 7.

The print data of the page image represented in PDL is transmitted from the information processing apparatus 160 to the image processing apparatus 100. The control unit 110 stores the received print data in the PDL in the data storage unit 130. Subsequently, to perform the print processing, the control unit 110 acquires the print data from the data storage unit 130 to start the image forming processing.

In step S701, the control unit 110 performs analysis on the acquired print data and extracts a rendering object such as a figure object (graphic) and a photo object (image) included in the page image. The rendering object may be simply referred to as an object.

In step S702, the control unit 110 generates from the analyzed print data the intermediate language data that can be rendered. The intermediate language generation processing described (refer to FIG. 8) herein performs both the intermediate language generation processing by the known technique and tile sequence conversion method selection processing (refer to FIG. 10), which is the feature of the present disclosure.

Subsequently, in step S703, based on the intermediate language converted in step S702 and a selection result by the tile sequence conversion method selection processing, the control unit 110 performs rendering processing (refer to FIG. 12) accompanied by the tile sequence conversion processing (described below). As a result, raster data representing the page image is generated. The generated raster data is the tile image data acquired by dividing the page image into tile-like shapes, and the subsequent image processing is performed on the tile image data in a tile unit. After the image processing of the subsequent stage is performed, the tile image data is transmitted to the printer unit 150, and then the printer unit 150 prints the image according to the received tile image data.

According to the present exemplary embodiment, it is the control unit 110 that performs the processing, however, a dedicated hardware may perform a series of processing.

<Outline of Tile Sequence Conversion Processing>

Prior to description of the tile sequence conversion method selection processing, which is the feature of the present disclosure, the tile sequence conversion processing in each data format will be described below.

<Tile Sequence Conversion Processing in Raster Format>

With reference to FIGS. 2A, 2B, 2C, 2D, 3A, and 3B, the tile sequence conversion processing performed in a raster format when the rendering processing is performed will be described. The tile sequence conversion processing in the raster format is the same as the processing in step S1206 illustrated in FIG. 12 described below, and performed on pixel information (raster information) after rendering is performed.

FIGS. 2A, 2B, 2C, and 2D are conceptual diagrams illustrating the page image and tile according to the present exemplary embodiment, and also conceptual diagrams illustrating change of data arrangement performed by the tile sequence conversion processing.

Figure 2A:
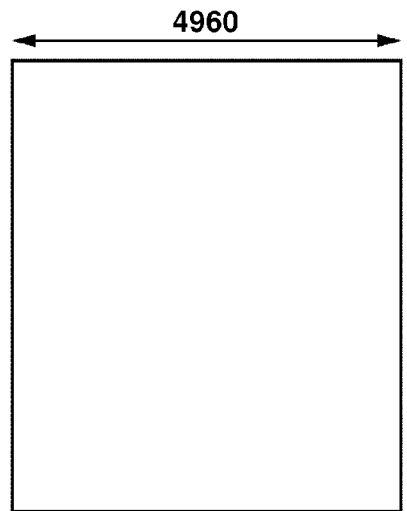
FIGS. 2A, 2B, 2C, and 2D are conceptual diagrams illustrating an example when page image data in page line sequence is converted into tile sequence.
Figure 2B:
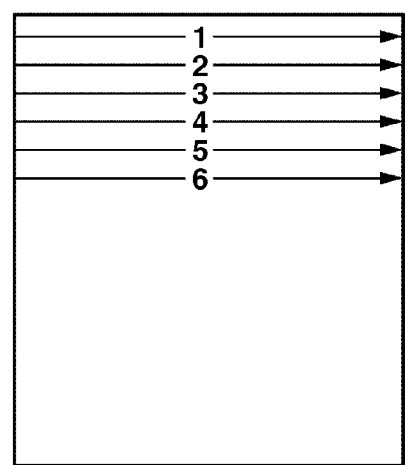
Figure 2C:
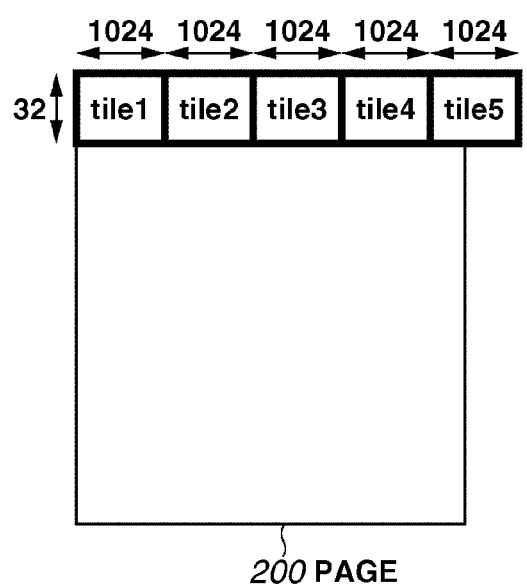

According to the present disclosure, the control unit 110 divides the page image illustrated in "page image conceptual illustration" of FIG. 2A into tile regions having a predetermined size as illustrated in "tile division conceptual illustration" of FIG. 2C. When the image is divided, as illustrated in "data sequence (page line sequence) conceptual illustration" of FIG. 2B, the arrangement of the image data in the raster format after rendering is performed, is input in a line unit having a page width into the work buffer. The page width herein corresponds to a length of one arrow in a lateral direction illustrated in the "data sequence (page line sequence) conceptual illustration" of FIG. 2B. The image data is input to the work buffer in a line sequence from a top (sequence of line 1, line 2, line 3, line 4, line 5, and line 6).

Figure 2D:
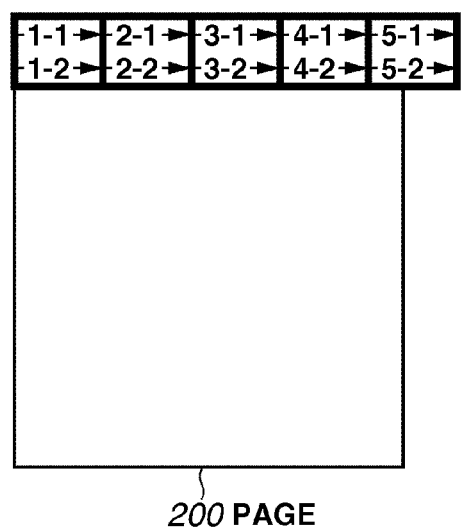

As illustrated in "data sequence (tile sequence) conceptual illustration" of FIG. 2D, the control unit 110 converts the arrangement of the image data stored in the work buffer into the sequence in a line unit (tile line sequence) of a predetermined tile width in the tile sequence conversion processing, and then outputs the converted arranged image data from the work buffer. The tile width herein corresponds to the length of one arrow in the lateral direction illustrated in the "data sequence (tile sequence) conceptual illustration" of FIG. 2D. The image data in tile line sequence output from the work buffer is tile image data divided as the image data in the tile region having the predetermined size illustrated in the "tile division conceptual illustration" of FIG. 2C. As illustrated in the "tile division conceptual illustration" of FIG. 2C and the "data sequence (tile sequence) conceptual illustration" of FIG. 2D, a tile 1 is formed of a tile line 1-1 and a tile line 1-2 having the tile width. Tiles 2 to 5 are formed in a similar manner. In other words, the tile sequence conversion processing converts the image data (image data in page line sequence) arranged in sequence of a line unit having the page width (page line sequence) into the image data (image data in tile sequence) arranged in sequence of a line unit having the tile width (tile sequence).

According to the example illustrated in the "data sequence (tile sequence) conceptual illustration" of FIG. 2D, one tile includes two lines corresponding to the tile width, and a length between two lines is a height of the tile. In other words, the number of lines corresponding to the tile width used to form one tile is referred to as the height of the tile. Further, since the height of the tile corresponds to a height of the band region including a plurality of tiles (tiles 1 to 5 illustrated in the "tile division conceptual illustration" of FIG. 2C), it is also referred to as the height of the band. The tile height and tile width, and the page width described above are only an example, and the present disclosure is not limited thereto. The concept of the tile width and tile height described above is applicable to that in the tile sequence conversion processing in the vector format described with reference to FIGS. 4 and 5.

FIGS. 3A and 3B are conceptual diagrams illustrating raster data in page line sequence and in tile sequence illustrated in FIG. 2 according to the present exemplary embodiment.

As illustrated in "raster information (page line sequence) conceptual illustration" of FIG. 3A, the page image data has a data format of sequential pixel data running in a direction from a left end to a right end in a line unit having a page width. In the data format, the pixel data is arranged in a sequence of, as illustrated in FIGS. 3A and 3B, Pixel 1-1, Pixel 1-2, . . . Pixel 1-4960, Pixel 2-1, Pixel 2-2, . . . Pixel 2-4960, and so on.

In the tile sequence conversion processing, the control unit 110 arranges the pixel data as illustrated in FIG. 3A to be the pixel data for each tile region in a line unit (tile line) having the tile width from the top in a sequence as illustrated in "raster information (tile sequence) conceptual illustration" of FIG. 3B. The arrangement of the pixel data in the data format in the page line sequence is changed into the pixel data in the data format in tile sequence to realize the tile sequence conversion processing.

The sequence in which the pixel data in the data format of tile sequence is arranged is, as illustrated in FIG. 3, tile line 1-1, tile line 1-2, . . . tile line 1-$n$, . . . tile line 1-32, tile line 2-1, tile line 2-2, . . . tile line 2-$n$, . . . tile line 2-32, and so on. In other words, the pixel data is arranged in sequence of Pixel 1-1, Pixel 1-2, . . . Pixel 1-1024, Pixel 2-1, Pixel 2-2, . . . Pixel 2-1024, . . . Pixel 32-1, . . . Pixel 32-1024, Pixel 1-1025, Pixel 1-1026, . . . Pixel 1-2048, Pixel 2-1025, . . . Pixel 2-2048, and so on.

As described above, the pixel data in page line sequence is divided and converted into the pixel data in tile sequence, and this processing is referred to as "tile sequence conversion (raster method) processing" hereinafter. The tile sequence conversion (raster method) processing facilitates transmission of the pixel data grouped in each tile to the subsequent processing unit. When the tile sequence conversion (raster method) processing is performed, the control unit 110 temporarily stores in the work buffer the raster image in page line sequence corresponding to the tile height illustrated in the "raster information (page line sequence) conceptual illustration" of FIG. 3A. The control unit 110 reads the raster image in tile sequence to realize the tile sequence conversion (raster method) processing. A calculation method of a usage amount (buffer memory size) of the work buffer employed at that time is represented by the following equation.

Buffer memory size (raster method)=(the number of pixels in main scanning direction)×(the number of pixels corresponding to tile height)×(data size for one pixel (e.g., in a case of CMYK (8 bits per 1 channel):4 bytes)  (Equation 1)

For example, when the pixel data of one pixel is formed of four CMYK colors of 8 bits (=1 byte) respectively, the data size for 1 pixel is 4 bytes. According to the present exemplary embodiment, a number of pixels in an A4 size in the main scanning direction is 4,960 pixels when a print resolution is 600 dpi, and the tile height is 32 pixels. Therefore, the buffer memory size of the portrait image (4,960 pixels×32 pixels) in the A4 size in the raster method according to the present exemplary embodiment is 634,880 bytes (=4,960×32×4)

In other words, the buffer memory size (in the raster method) is determined by the number of colors, the print resolution, the paper size, the page orientation, and the tile height regardless of image content such as the number of objects in the page image and the object arrangement. When the tile height (band height) is the same in each band region as in the present exemplary embodiment, since the print setting should be the same during one print job, the buffer memory size (raster method) is a constant value in the entire band region.

<Tile Sequence Conversion Processing in Vector Format>

With reference to FIGS. 4 and 5, a case where the tile sequence conversion of the rendering processing is performed in the vector format will be described. The tile sequence conversion in the vector format is the same as the processing described below in step S1203 illustrated in FIG. 12 and performed on the span information (vector information) before rendering is performed.

FIGS. 4A and 4B are conceptual diagrams of the vector information according to the present exemplary embodiment. FIG. 4A illustrates the span information about each object included in a band 401 in the page image. FIG. 4B illustrates the span information in tile sequence included in the band 401 when the band 401 is divided into tiles. The span information indicates, when one line is separated at an edge of the object, a closed region in the line having an edge as an end point. Further, FIG. 4A is a conceptual diagram illustrating the data sequence described below with reference to FIG. 5A. FIG. 4B is a conceptual diagram illustrating the data sequence described with reference to FIG. 5B.

As the span information in the band 401 illustrated in FIG. 4A, type of the span information included in each band varies depending on each region divided into three in a lateral direction (sub-scanning direction) according to a position of the object.

For example, rendering of the page including a figure object (graphic) 402 that is a rendering object and a photo object (image) 403 like a page 400 will be described. When the page is rendered, with respect to the band 401 having a predetermined band height, the line in the band is divided into a plurality of types of spans, for example, span 1, span "m", span m+1, span "n", span n+1, span n+2, span n+3, as illustrated in FIG. 4A. More specifically, a region 1 includes the span 1 configured of the number of lines corresponding to the height of the region 1. Further, a region 2 includes the span "m" and the span m+1 configured of the number of lines corresponding to the height of the region 2. Furthermore, a region 3 includes the span "n", the span n+1, the span n+2, and the span n+3 corresponding to the height of the region 3.

A region surrounded with a broken line illustrated in FIG. 4B is a region corresponding to the band 401 illustrated in FIG. 4A. Further, each tile region in the broken line region illustrated in FIG. 4B corresponds to each tile region described with reference to FIG. 2C and has the predetermined tile width and height. Furthermore, a size of the tile region illustrated in FIG. 4B is equal to the size of the tile region described with reference to FIG. 2C.

For example, the tile 1 illustrated in FIG. 4B includes a set of a span "a" configured of the number of lines corresponding to the height of the region 4, a span "b" configured of the number of lines corresponding to the height of a region 5, a span "c" and a span c+1 configured of the number of lines corresponding to the height of a region 6. Further, a tile 2 includes a set of a span "x" configured of the number of lines corresponding to the height of the region 7, a span and a span y+1 configured of the number of lines corresponding to the height of a region 8, and a set of a span "z" and a span z+1 configured of the number of lines corresponding to the height of a region 9.

Figure 5B:
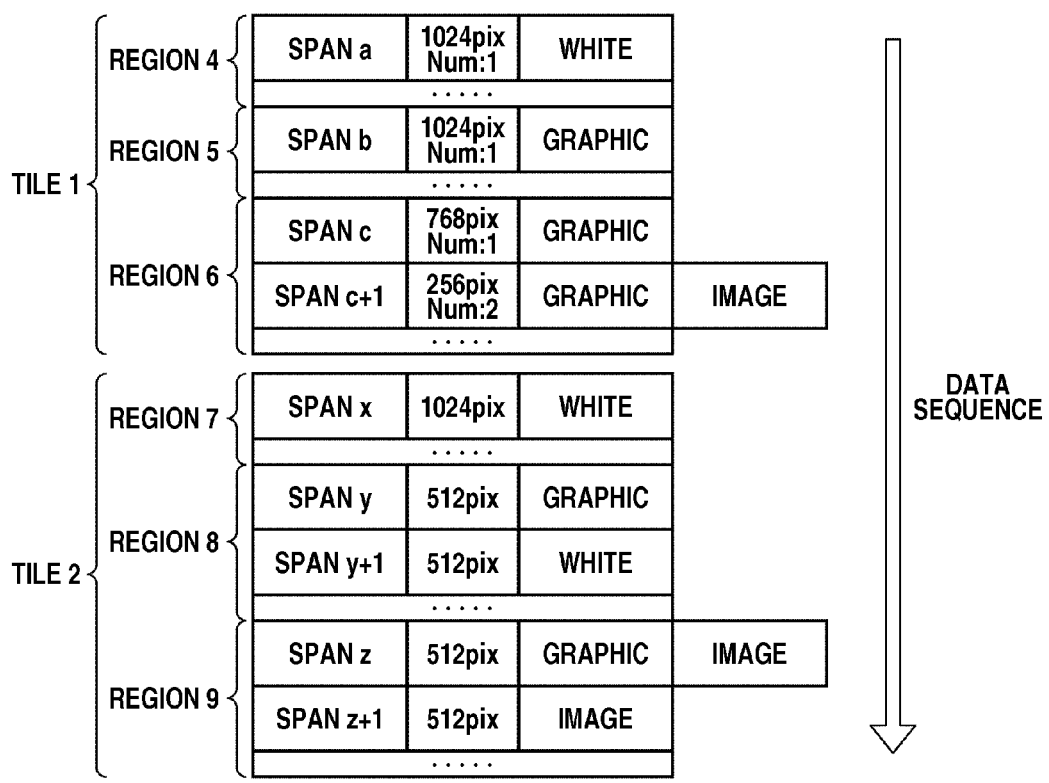

FIGS. 5A and 5B are conceptual diagrams illustrating data formats of the image data represented by the span information in page line sequence and in tile sequence illustrated in FIGS. 4A and 4B according to the present exemplary embodiment. The span information illustrated in FIG. 5A is the span information in page line sequence generated based on the intermediate language data generated in step S702. Various types of methods are provided to generate the span information in page line sequence from the intermediate language data, and the present disclosure is not limited to the method for generating the span information in page line sequence from the intermediate language data.

As illustrated in the "span information (page line sequence) conceptual illustration" of FIG. 5A, each span information includes span header information about the span indicated by each span number and identification information (object identification information) about the object included in the span. The span header information indicates a length of the span indicated by each span number, and the number of the objects included in the span. For example, as illustrated in FIG. 5A, since the span length is 1536 pixel and one object is included in the span "m", the span header information in FIG. 4A about the span "m" in the region 2 before the tile sequence conversion processing is performed is "Num: 1". Further, since the span "m" includes the graphic 402, the span information about the span "m" includes the object identification information (graphic) indicating the graphic 402. Further, in the span n+1 in the region 3 illustrated in FIG. 4A, the graphic 402 overlaps with the image 403. Therefore, since the span n+1 includes two objects, the span header information about the span n+1 is "Num: 2". The span information about the span n+1 includes the identification information indicating the graphic 402 and the image 403 as the object identification information.

The control unit 110 performs processing for changing the arrangement of the span data in page line sequence as illustrated in FIG. 5A, to the span data in tile sequence as illustrated in the "span information (tile sequence) conceptual illustration" of FIG. 5B. This processing is referred to as tile sequence conversion (vector method) processing.

For example, as illustrated in FIG. 5B, the span header information about the span "a" in the region 5 after the tile sequence conversion processing illustrated in FIG. 4B is performed is "Num: 1", since the span length is 1,024 pixels, and the span "a" includes one object. Further, since the span "a" includes the graphic 402, the span information about the span "a" includes the object identification information indicating the graphic 402. Further, for example, the span header information about the span c+1 in the region 6 illustrated in FIG. 4B indicates that the span length is 256 pixels as illustrated in FIG. 5B. Furthermore, since the span c+1 includes two objects of the graphic 402 and the image 403 that overlap each other, the span header information which is "Num: 2" indicates two objects. The span information about the span c+1 includes the object identification information indicating the graphic 402 and the image 403.

In other words, the tile sequence conversion (vector method) processing converts the image data in the data format represented by the span data in page line sequence into the image data in the data format represented by the span data in tile sequence. In the data format represented by the span data in page line sequence, the sequence of the span data is, for example, as illustrated in FIG. 5A, span 1, span 1, . . . span "m", span m+1, span "m", span m+1, . . . span "n", span n+1, span n+2, span n+3, span "n", span n+1, span n+2, span n+3, and so on. Further, the sequence of the span data in tile sequence is, for example, as illustrated in FIG. 5B, span "a", span "a", . . . span "b", span "b", . . . span "c", span c+1, span "c", span c+1 . . . span "x", span "x", . . . span "y", span y+1, span "y", span y+1, . . . span "z", span z+1, span "z", span z+1, and so on.

Such processing for dividing and converting span data in page line sequence into the span data in tile sequence is the tile sequence conversion (vector method) processing. The tile sequence conversion (vector method) processing facilitates transmission of the span data grouped in each tile to the subsequent processing unit. When the tile sequence conversion (vector method) processing is performed, the control unit 110 temporarily stores the span data in page line sequence corresponding to the tile height as illustrated in the "span information (page line sequence) conceptual illustration" of FIG. 5A. The control unit 110 divides the span data into the tile width and reads it in tile sequence to realize the tile sequence conversion (vector method). The buffer memory size employed at that time is a value acquired by summing up a value of (the number of spans×size of span header information+the number of objects included in each span×size of object identification information) in each page line, corresponding to the tile height.

In other words, the buffer memory size (vector method) can be acquired based on the span information determined based on the number of the objects and the arrangement thereof included in the image. The buffer memory size (vector method) fluctuates depending on the image content such as the number of the objects and the arrangement thereof in the page image.

<Tile Sequence Conversion Processing on Page Image Including Great Number of Objects>

Figure 6:
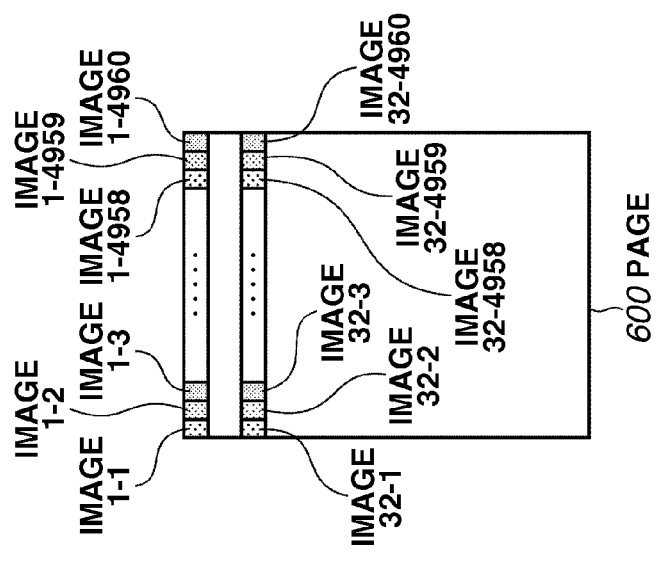
FIG. 6 illustrates an example when a data size of the span information is increased significantly.

FIG. 6 illustrates an example when the data of the span information according to the present exemplary embodiment has a significantly huge size.

For example, as illustrated in FIG. 6, when a great number of different images of 1×1 in a predetermined region is rendered, the span data is formed as illustrated in the "span information (page line sequence) conceptual illustration" of FIG. 5A, and includes 158,720 (4,960×32) spans. Thus, when the size of the span header information is 4 bytes and that of the object identification information is 4 bytes, the buffer memory for temporary storage is employed to have the size as described below.

> Buffer memory size (vector method)=(the number of spans×the number of objects in span×4)×(the number of pixels corresponding to tile height)  (Equation 2)

Therefore, when the tile height (band height) is set to 32 pixels, the buffer memory size that is the usage amount of the work buffer employed for the tile sequence conversion processing in the vector method on the page image illustrated in FIG. 6 is described as below.

> Buffer memory size (vector method)=((4,960 span× 4)+(4,960 objects×4))×32=1,269,760 bytes On the other hand, when the band height is set to 32 pixels, the buffer memory size employed when the tile sequence conversion processing is performed in the raster format on the page image is 634,880 bytes as calculated above, and it is smaller than the memory size employed by the tile sequence conversion processing in the vector format.

Since a user can freely add the rendering object in the page image, the work buffer having the size larger than the above-described size may be used.

As described above, when the great number of objects are included in the page image and when the tile sequence conversion processing in the vector format is performed, the work buffer having a larger size may be employed than when the tile sequence conversion processing in the raster format is performed.

Further, due to natures of the span information, when the objects overlap each other, since the amount of span information and the identification information about the object included in the span are increased, the size of the buffer memory may become significantly larger than the employed work buffer depending on how the objects are overlaid with each other.

Thus, to reduce the size of the buffer memory of the employed work buffer, it is determined whether the tile sequence conversion processing is to be performed in the vector format or in the raster format before the tile sequence conversion processing is performed (when the intermediate language generation processing is performed in step S702 illustrated in FIG. 7). According to a result of the determination, the tile sequence conversion processing is performed in the rendering processing in step S703 illustrated in FIG. 7.

<Intermediate Language Generation Processing>

Figure 8:
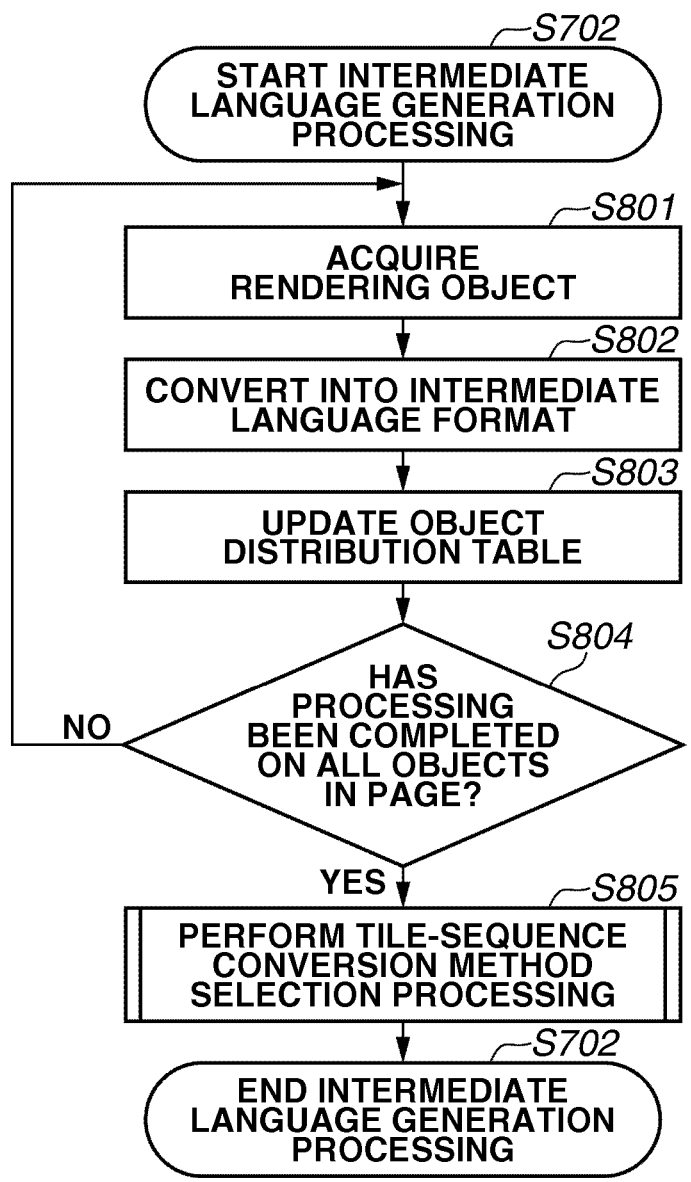
FIG. 8 illustrates a detailed flow of intermediate language generation processing.

FIG. 8 illustrates a detailed flow of intermediate language generation processing in step S702 illustrated in FIG. 7 according to the present exemplary embodiment. The intermediate language generation processing includes the tile sequence conversion method selection processing, which is the feature of the present disclosure.

In step S801, the control unit 110 acquires the rendering object included in the page image extracted by the analysis processing in step S701.

In step S802, the control unit 110 converts the rendering object acquired in step S801 into a predetermined intermediate language format.

Figure 9:
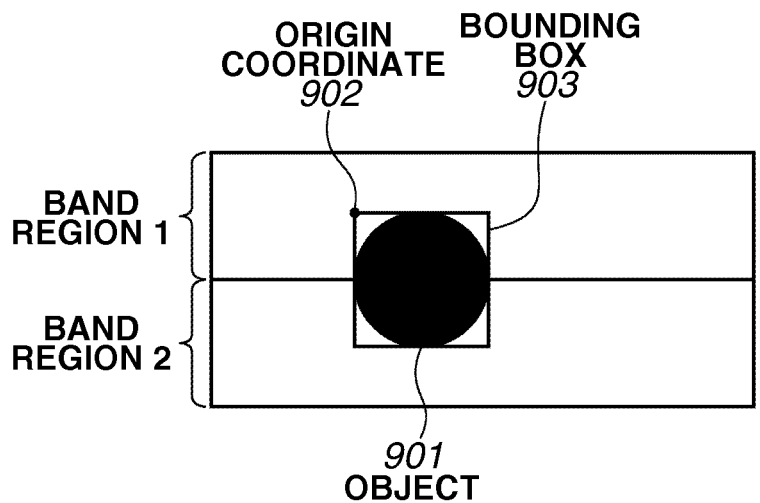
FIG. 9 is a conceptual diagram of an object distribution table used for object distribution table update processing and illustrates an example of update processing.

In step S803, the control unit 110 performs update processing on an object distribution table. The object distribution table manages, like an object distribution table 910 illustrated in FIG. 9, the number of objects included in each band region when the page image is divided into the tile height. Further, as described below, when an operation system of changing the tile sequence conversion method for each band is employed, information about the "tile sequence conversion method" is retained to store the selected method. For example, when the object 901 is extracted in step S701, based on an origin coordinate 902 (coordinate (100, 48)) and the width and height information (width 32 and height 32 according to the present exemplary embodiment) about an object referred to as a bounding box 903, it is determined in which region the object is included. Based on the determination result, the update processing of the number of the objects included in the object distribution table is performed. Since the band region 1 illustrated in FIG. 9 includes one object 901, the number of the object is one. Further, similarly, the number of the objects in a band region 2 is one. Furthermore, the distribution information about the object includes various types of known techniques, and thus the distribution of the objects may be determined using those techniques.

In step S804, the control unit 110 determines whether the processing in steps S801, S802, and S803 has been performed on all objects in the page image. When it is determined that the processing has not been performed (NO in step S804), the processing proceeds to step S801. When it is determined that the processing in steps S801, S802, and S803 has been performed on all objects (YES in step S804), the processing proceeds to step S805.

In step S805, the control unit 110 performs the selection processing of the method of the tile sequence conversion processing. This processing determines whether the "tile sequence conversion (raster method) processing" or the "tile sequence conversion (vector) processing" can perform the tile sequence conversion processing with a smaller memory size, and further whether the processing is advantageous for a memory band. The control unit 110 performing the processing in step S805 functions as the tile sequence conversion method determination unit, and then gives an instruction for the optimum tile sequence conversion processing selected by the rendering processing in step S703. More details will be described with reference to FIG. 10.

<Tile Sequence Conversion Method Selection Processing>

Figure 10:
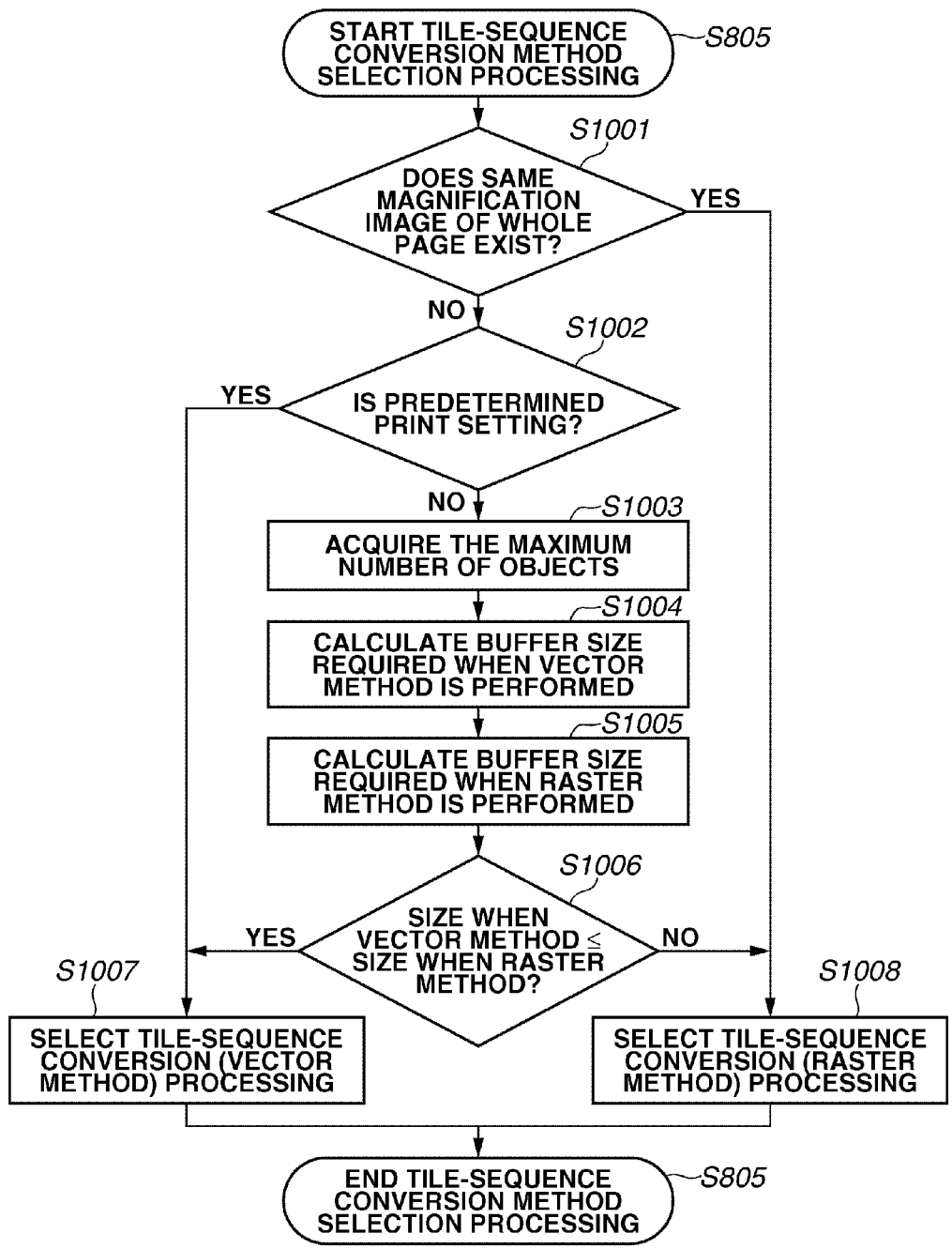
FIG. 10 illustrates a detailed flow of tile sequence conversion method selection processing according to a first exemplary embodiment.

FIG. 10 illustrates a detailed flow of the first exemplary embodiment of the tile sequence conversion method selection processing in step S805 illustrated in FIG. 8 according to the first exemplary embodiment.

In step S1001, the control unit 110 determines whether a random access memory (RAM) 113 stores a same magnification image included in the page image for which the image forming processing has been instructed. The same magnification image herein refers to the image having the width and height of the entire page face in the raster format on which rendering has been performed. When the processing for over-laying the image in the band region including a predetermined object onto the image having the width and height of the entire page face, the control unit 110 determines that the same magnification entire surface image has been already stored when the page image is generated. The image to be overlaid is also referred to as a superimposition image. Since the image in the band region including a predetermined object is overlaid (superimposed), the memory region occupied by the entire face image once read from the RAM 113 becomes free. Thus, for example, when the tile sequence conversion (raster method) processing is performed, at the time that the rendering by overlaying is completed, the image data stored in the RAM 113 is not needed. The space in the memory region in the RAM 113 becomes available as the work buffer for the tile sequence conversion (raster method) processing. Therefore, a new memory region for the work buffer does not need to be secured.

In other words, in such a case, the tile sequence conversion (raster method) processing is more advantageous with respect to a required memory size. Therefore, when it is determined that the RAM 113 stores the same magnification image (YES in step S1001), the processing proceeds to step S1008. When it is determined that the RAM 113 does not store the same magnification image (NO in step S1001), the processing proceeds to step S1002.

In step S1002, the control unit 110 determines whether the print setting of the page image for performing the image forming processing is predetermined print setting. The print setting is predetermined such that the memory size of the work buffer used when the image in tile sequence is generated by the tile sequence conversion (raster method) processing, likely becomes larger than the memory size of the work buffer used when the tile sequence conversion (vector method) processing is performed.

In the print setting herein, the setting is determined which influences the size of the work buffer employed for the tile sequence conversion (raster method) processing. For example, the settings of the "color setting", "print resolution setting, "paper size setting", and "page orientation setting", which are items of the print setting, significantly influence the size of the work buffer employed by the tile sequence conversion (raster) method. For example, when the color/monochrome is set to CMYK color, the print resolution is set to 1,200 dpi, the paper size is set to A3, and the page orientation is set to landscape, the setting value of the print setting uses the size described below based on the Equation 1.

Buffer memory size (raster method) for $A3$, 1,200 dpi, and landscape=19,840 pixels×32 pixels×4 bytes/pixel=2,539,520 bytes In other words, the size of the buffer memory four times larger than when the paper size is the A4 size, the resolution is 600 dpi, and the page orientation is landscape is utilized.

As described above, depending on the print setting, when the tile sequence conversion processing is performed, the size of the word buffer used for the tile sequence conversion (raster method) processing may become significantly huge. In such a case, the determination processing for selecting the method is omitted to further facilitate the processing. In other words, the processing performed in step S1002 determines whether the print setting set for the print job is the predetermined print setting (the print setting in which the size of the buffer memory employed for the tile sequence conversion processing in the raster method as described above becomes extremely huge, and the tile sequence conversion processing in the vector method tends to be selected).

When it is determined that the print setting set for the print job is the predetermined print setting (YES in step S1002), the processing proceeds to step S1007. When it is determined that the print setting set for the print job is not the predetermined print setting (NO in step S1002), the processing proceeds to step S1003.

In step S1003, the control unit 110 searches for the band region including the maximum number of objects from the object distribution table generated in step S803, and performs acquisition processing of the number of the objects (maximum number of objects) in the band region.

In step S1004, the control unit 110 performs calculation of the size of the work buffer employed when the tile sequence conversion (vector method) processing is performed in a band region. The control unit 110 functions as a deriving unit for acquiring the size of the buffer memory (vector method). The size can be calculated, for example, according to the calculation processing described below, with reference to the calculation equation of the Equation 2. An estimation method of the size of the buffer memory (vector method) according to the present exemplary embodiment is only an example, and any method can be used as long as the size to be compared with the size of the buffer memory employed in the tile sequence conversion processing in the raster method can be calculated.

Maximum buffer memory size(vector method)= (Maximum number of spans×4+maximum number of spans×maximum number of superimposition×4)×tile height=((2×$n$+1)×4+(2×$n$+1)×$n$×4)× tile height (Equation 3)

The control unit 110 uses the maximum number of objects acquired in step S1003 for "n" to calculate the size of the maximum buffer memory (vector method), which does not become insufficient when the tile sequence conversion processing in the vector method is performed on the page image.

In step S1005, the control unit 110 calculates the size of the work buffer employed when the tile sequence conversion (raster method) processing is performed in a band region. The control unit 110 herein functions as the deriving unit for acquiring the buffer memory size (raster method). The calculation processing is performed using the above-described calculation equation (Equation 1).

In step S1006, the control unit 110 compares the usage amounts of the work buffer (size of buffer memory) calculated in steps S1004 and S1005 with each other. When it is determined that the size of the buffer memory used for the tile sequence conversion (vector method) processing is the size of the buffer memory used for the tile sequence conversion (raster method) processing or less (the usage amount of the memory or less) (YES in step S1006), the processing proceeds to step S1007. When it is determined that the size of the buffer memory used for the tile sequence conversion (vector method) processing is larger than the size of the buffer memory used for the tile sequence conversion (raster method) processing (NO in step S1006), the processing proceeds to step S1008.

If the processing proceeds to step S1007, then in step S1007, the control unit 110 sets the tile sequence conversion method in the object distribution table 910 to the "vector method", so that the tile sequence conversion (vector method) processing is selected for the tile sequence conversion processing in the rendering processing in step S703. Further, if the processing proceeds to step S1008, then in step S1008, the control unit 110 sets the tile sequence conversion method in the object distribution table 910 to the "raster method", so that the tile sequence conversion (raster method) processing is selected for the tile sequence conversion processing in the rendering processing in step S703. Thus, according to the first exemplary embodiment in the tile sequence conversion method selection processing in step S703, a method is selected by which the tile sequence conversion processing used in step S703 is uniformly performed in the page image.

The flow of the tile sequence conversion method selection processing illustrated in FIG. 10 is as described above. In the above-described flow, the number of the objects included in the image data is acquired in step S1003. In step S1004, based on the number of the objects, the size of the buffer memory used for the tile sequence conversion processing of the vector method is calculated. Although the work buffer of the tile sequence conversion processing in the raster method calculated in step S1005 is influenced by the print setting, the number of the objects is not influenced. In other words, when the vector method is used, the size of the buffer memory is influenced by the number of the objects, and when the raster method is used, the size of the buffer memory has a predetermined value according to the print setting. As a modification example of the tile sequence conversion method selection processing according to the present exemplary embodiment, when the number of the objects acquired in the step S1003 is a predetermined threshold value or more, the tile sequence conversion processing of the raster method may be selected. When the number of the objects acquired in step S1003 is less than the predetermined threshold value, the tile sequence conversion processing of the vector method may be selected. Further, the predetermined threshold value to be compared with the number of the objects may be variable depending on the print setting.

<Rendering Processing>

Figure 12:
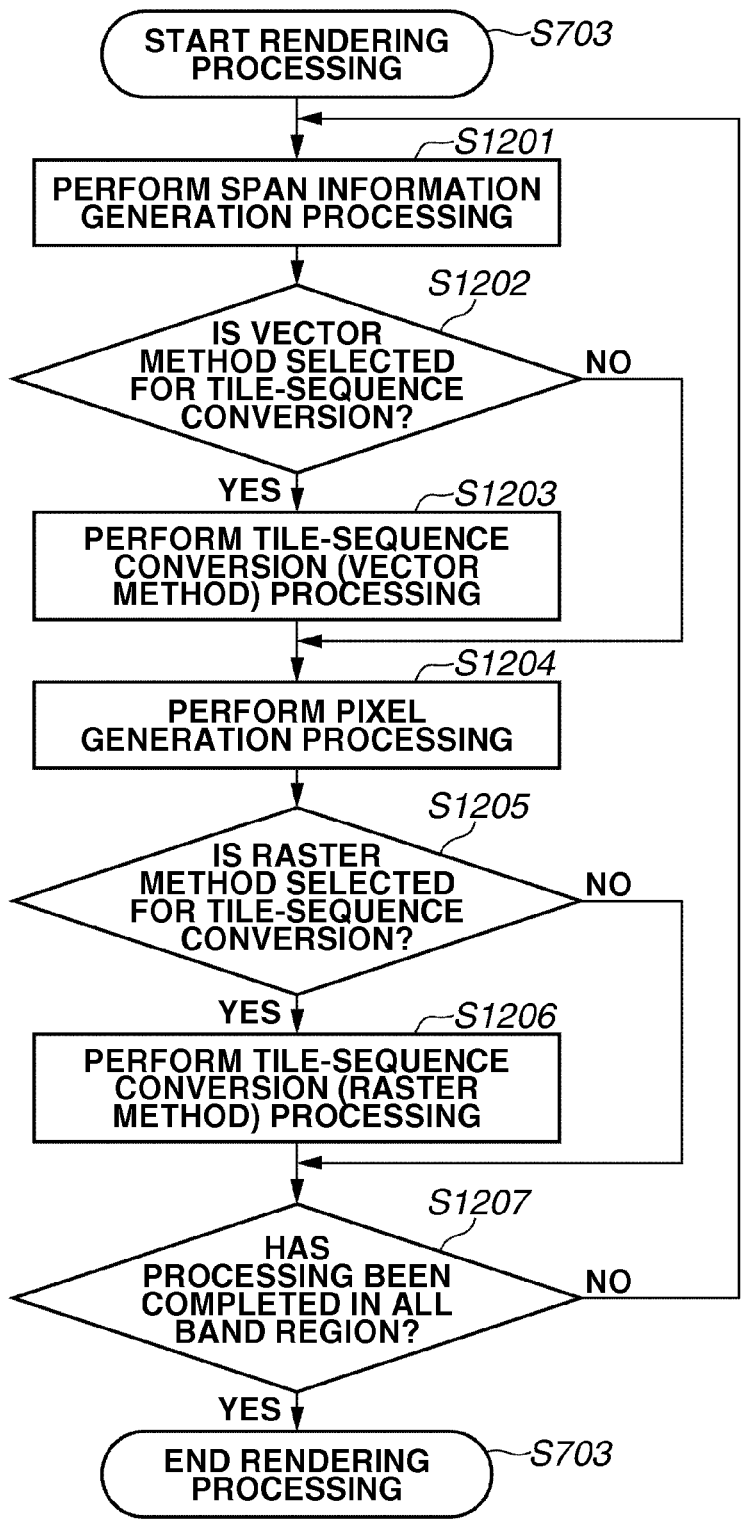
FIG. 12 illustrates a detailed flow of rendering processing according to the first exemplary embodiment.

FIG. 12 illustrates a detailed flow of rendering processing in step S703 when the first exemplary embodiment is performed by the tile sequence conversion method selection processing in step S805. According to the present second exemplary embodiment, the rendering processing is performed by sequentially rendering the intermediate language data for each band region corresponding to each band region in the page image. In other words, the processing in steps S1201 to S1206 described below is performed for one band region to be processed.

In step S1201, the control unit 110 reads the intermediate language data generated in step S702 for the band region to be processed, and generates the span information illustrated in the "span information (page line sequence) conceptual illustration" of FIG. 5A. The control unit 110 herein functions as a span generation unit for generating the span information in page line sequence from the intermediate language data.

In step S1202, with reference to the object distribution table 910, the control unit 110 determines whether the tile sequence conversion (vector method) processing has been selected in the tile sequence conversion method selection processing in step S805. When it is determined that the tile sequence conversion (vector method) processing has been selected (YES in step S1202), the processing proceeds to step S1203. On the other hand, when it is determined that the tile sequence conversion (raster method) processing has been selected (NO in step S1202), the processing proceeds to step S1204.

When the processing proceeds to step S1203, then in step S1203, the control unit 110 stores in the work buffer the span information for the band region to be processed that is generated in step S1201 and performs the tile sequence conversion (vector method) processing. The control unit 110 herein uses the work buffer (memory) to function as a first conversion processing unit for converting the span information into information in tile sequence.

More specifically, the processing can be realized by converting the span data sequence illustrated in the span information (page line sequence) conceptual illustration of FIG. 5A into the span data sequence for each tile illustrated in the span information (tile sequence) conceptual illustration of FIG. 5B. At this time, as described above, the span information in page line sequence corresponding to the band region to be processed is stored in the work buffer, and then converted into the span information in tile sequence when it is read out. By this processing, the processing in step S1204 and the subsequent image processing (not illustrated) can be performed on the image data in a tile unit.

In S1204, the control unit 110 performs predetermined rendering processing on the span information in page line sequence transmitted from step S1202 or the span information in tile sequence transmitted from step S1203 to generate the pixel data. The control unit 110 herein functions as a pixel generation unit for generating the pixel information from the span information.

In step S1205, the control unit 110 determines whether the tile sequence conversion (raster method) processing has been selected in the tile sequence conversion method selection processing in step S805. When it is determined that the tile sequence conversion (raster method) processing has been selected (YES in step S1205), the processing proceeds to step S1206. On the other hand, when it is determined that the tile sequence conversion (vector method) processing has been selected (NO in step S1205), the control unit 110 transmits the generated pixel information in tile sequence to the printer unit 150 and then ends the processing.

In step S1206, the control unit 110 stores in the work buffer the pixel information (raster information) about the band region to be processed that has been generated in step S1204 and performs the tile sequence conversion (raster method) processing. The control unit 110 herein functions as a second conversion processing unit for converting the pixel information into the pixel information in tile sequence using the work buffer (memory).

More specifically, the processing can be realized by converting the pixel data sequence illustrated in the raster information (page line sequence) conceptual illustration of FIG. 3A into the pixel data sequence for each tile illustrated in the raster information (tile sequence) conceptual illustration of FIG. 3B. At this time, as described above, the raster information in page line sequence corresponding to the band region to be processed is stored in the work buffer, and then converted into the raster information in tile sequence when it is read out. By this processing, the subsequent image processing (not illustrated) can be performed on the image data in a tile unit.

In step S1207, the control unit 110 determines whether the rendering processing for each band region has been completed for all band regions to be processed in the page image. When the control unit 110 determines that the rendering processing for all band regions has not been completed (NO in step S1207), the processing proceeds to step S1201 to repeat the processing in steps S1201 to S1206 on the subsequent band region set as the band region to be processed. When the control unit 110 determines that the rendering processing has been completed for the all band regions, the rendering processing in step S703 ends.

In the processing flow described above with reference to FIG. 12, the tile sequence conversion processing is performed on the image in the band region. However, according to the present disclosure, in place of the image in the band region, the tile sequence conversion processing may be performed on the page image of one page. In such a case, in step S805 where the processing method of the tile sequence conversion processing is selected, the sizes of the buffer memory for the page image are compared with each other, and according to the result, the tile sequence conversion processing is performed on the page image. At this time, in step S1201, the control unit 110 generates the span information in line data sequence about the entire page image. Further, loop processing by the determination processing in step S1207 can be omitted.

In the processing flow illustrated in FIG. 12, in steps S1202 and S1205, it is determined for each band region whether the vector method or the raster method is used as the processing method of the tile sequence conversion processing. To omit the determination processing for each band processing, before the rendering processing in step S703 starts, the processing method of the tile sequence conversion may be determined according to the processing flow illustrated in FIG. 10 and the subsequent processing may be switched according to the determined processing method. For example, after step S1201 is performed, if the vector method is determined as the processing method, the continuous processing in steps S1203, S1204, and S1207 may be performed. Further, if the raster method is determined as the processing method, the continuous processing in steps S1204, S1206, and S1207 may be performed.

As described above, the image processing apparatus according to the present exemplary embodiment determines in a page unit the processing method of the tile sequence conversion processing using the work buffer. Thus, the tile sequence conversion processing can be performed which reduces the usage amount of the memory of the work buffer according to the content of the page image, while load for switching to the method of the tile sequence conversion processing is reduced.

The first exemplary embodiment describes the method for uniquely determining tile sequence conversion processing in a page unit. In the second exemplary embodiment, the method for determining the optimum tile sequence conversion processing in a band unit is described. With such arrangements, the present exemplary embodiment can further reduce the size of the work buffer using a band unit. The image processing apparatus according to the present exemplary embodiment has similar configurations to those of the image processing apparatus 100 according to the first exemplary embodiment, and thus the description is not repeatedly described.

<Tile Sequence Conversion Method Selection Processing for Each Band>

Figure 11:
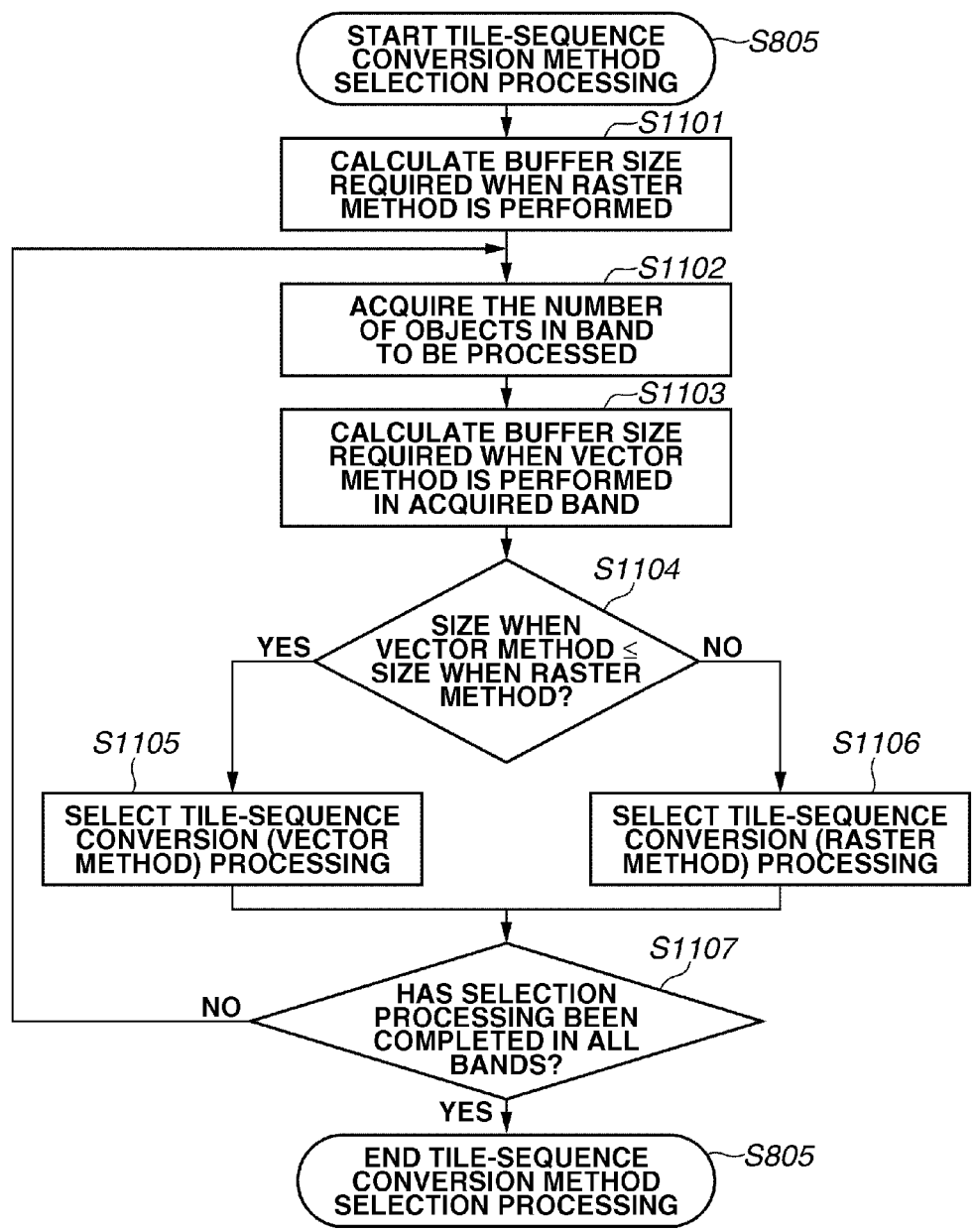
FIG. 11 illustrates a detailed flow of tile sequence conversion method selection processing according to a second exemplary embodiment.

FIG. 11 illustrates a detailed flow of the second exemplary embodiment of tile sequence conversion method selection processing in step S805 illustrated in FIG. 8. This flow is a processing flow for selecting the method of the tile sequence conversion processing for each of one or more band regions included in the page image.

In step S1101, the control unit 110 calculates the size of the work buffer employed when the tile sequence conversion (raster method) processing is performed. The calculation processing is performed using the above-described calculation equation (Equation 1). When the band sizes of the band regions are different from each other, the size of the work buffer used for the tile sequence conversion processing performed in the raster method may be sequentially calculated for the band region to be processed.

The control unit 110 takes out an unprocessed band for which the tile sequence conversion method is not selected by the tile sequence conversion method selection processing, from the object distribution table generated in step S803, and determines the unprocessed band as the band region to be processed. In step S1102, the control unit 110 acquires the number of the objects included in the band region to be processed from the object distribution table 910.

In step S1103, based on the number of the objects in step S1102, the control unit 110 calculates the size of the work buffer used when the tile sequence conversion (vector method) in the band region to be processed is performed. The calculation processing is performed using the above-described calculation equation (Equation 3).

In step S1104, the control unit 110 compares the sizes of the work buffer calculated in steps S1101 and S1103 with each other. When it is determined that the size of the work buffer used for the tile sequence conversion (vector method) processing is equal to that for the tile sequence conversion (raster method) processing or smaller (YES in step S1104), the processing proceeds to step S1105. When it is determined that the size of the work buffer used for the tile sequence conversion (vector method) processing is larger than that for the tile sequence conversion (raster method) processing (NO in step S1104), the processing proceeds to step S1106.

When the processing proceeds to step S1105, then in step S1105, the control unit 110 performs control such that the tile sequence conversion (vector method) processing is selected for the tile sequence conversion processing in the rendering processing in step S703 for the band region to be processed.

Further, when the processing proceeds to step S1106, then in step S1106, the control unit 110 performs control such that the tile sequence conversion (raster method) processing is selected for the tile sequence conversion in the rendering processing in step S703 for the band region to be processed.

In steps S1105 and S1106, the control unit 110 stores in the object distribution table 910 the processing method of the tile sequence conversion for each selected band region, with respect to the band region to be processed.

In step S1107, the control unit 110 determines whether the tile sequence conversion method selection processing for each band region has been completed with respect to all band regions included in the page image. When it is determined that it has not been completed (NO in step S1107), the processing returns to step S1102. When it is determined that it has been completed (YES in step S1107), the processing ends the tile sequence conversion method selection processing in step S805.

<Rendering Processing for Each Band>

Figure 13:
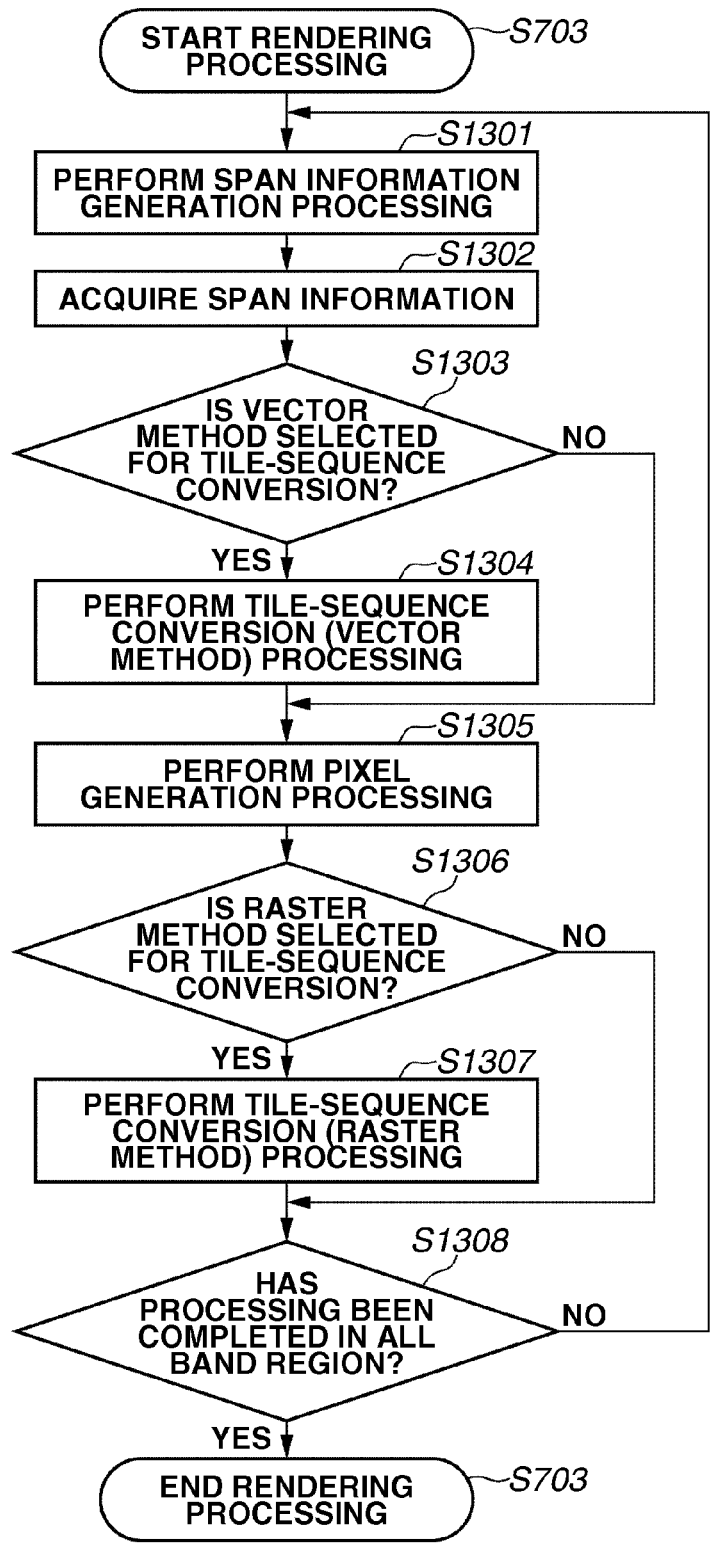
FIG. 13 illustrates a detailed flow of rendering processing according to the second exemplary embodiment.

FIG. 13 illustrates a detailed flow of rendering processing in step S703 when the second exemplary embodiment is performed in the tile sequence conversion method selection processing in step S805. This flow is performed by the control unit 110. This flow represents the processing for sequentially performing rendering for each band to be processed.

In step S1301, the control unit 110 receives the intermediate language data generated in step S702 to generate the span information illustrated in the "span information (page line sequence) conceptual illustration" of FIG. 5A.

The control unit 110 acquires the span information within the band region to be processed, from the span information generated in step S1301, and the selection information about the processing method of the tile sequence conversion processing selected in the tile sequence conversion method selection processing in step S1302 corresponding to the acquired span information.

In step S1303, the control unit 110 determines whether the selection information about the processing method of the tile sequence conversion processing for the band region to be processed, which has been acquired in step S1302, indicates that the tile sequence conversion (vector method) processing has been selected. When it is determined that the tile sequence conversion (vector method) processing has been selected (YES in step S1303), the processing proceeds to step S1304. When it is determined that the tile sequence conversion (raster method) processing has been selected (NO in step S1303), the processing proceeds to step S1305.

When the processing proceeds to step S1304, in step S1304, the control unit 110 stores the span information in the band region to be processed, which has been acquired in step S1302, and performs the tile sequence conversion (vector method) processing.

More specifically, the control unit 110 performs the processing for converting the span data illustrated in the "span information (page line sequence) conceptual illustration" of FIG. 5A into the span data in tile sequence illustrated in the "span information (tile sequence) conceptual illustration" of FIG. 5B. At this time, as described above, the processing can be realized by storing the data illustrated in the span information (page line sequence) in the work buffer and converting the data into the data illustrated in the span information (tile sequence) conceptual illustration when it is read out. By this process, the processing in step S1305 and the subsequent image processing (not illustrated) can be performed on the image data in a tile unit.

In step S1305, the control unit 110 generates the pixel data from the span information in page line sequence transmitted from step S1302 or the span information in tile sequence transmitted from step S1303, by performing the predetermined rendering processing.

In step S1306, the control unit 110 determines whether the selection information about the tile sequence conversion processing method for the process target band region, which has been acquired in step S1302, indicates that the tile sequence conversion (raster method) processing has been selected. When it is determined that the tile sequence conversion (raster method) processing has been selected (YES in step S1306), the processing proceeds to step S1307. When it is determined that the tile sequence conversion (vector method) processing has been selected (NO in step S1306), the processing proceeds to step S1308.

When the processing proceeds to step S1307, in step S1307, the control unit 110 stores the pixel information (raster information) generated in step S1305 in the work buffer to perform the tile sequence conversion (raster method) processing.

More specifically, as illustrated in FIG. 3, the process can be realized when the processing for converting the raster information (page line sequence) conceptual illustration into the raster information (tile sequence) conceptual illustration is carried out. At this time, as described above, the process can be realized by storing the data illustrated in the span information (page line sequence) in the work buffer and converting the data into the data illustrated in the span information (tile sequence) conceptual illustration when it is read. As a result of this processing, the subsequent image processing (not illustrated) can be performed on the image data in a tile unit.

In step S1308, the control unit 110 determines whether the rendering processing for each of all band regions of processing targets included in the page image has been completed. When the control unit 110 determines that it has not been completed (NO in step S1308), the processing returns to step S1301, and the control unit 110 repeats the processing steps from S1301 to S1307 for the next band region as a process target. When the control unit 110 determines that it has been completed (YES in step S1308), the rendering processing ends in step S703.

As described above, the image processing apparatus according to the second exemplary embodiment determines in a band region the method of the tile sequence conversion processing to be performed on the band region according to the content of the band region. Therefore, the present exemplary embodiment can further reduce the size of the work buffer to be used in a band region.

Other Embodiments

Embodiments of the present disclosure can also be realized by a computer of a system or apparatus that reads out and executes computer executable instructions recorded on a storage medium (e.g., non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, in the tile sequence conversion processing, a significant increase of a memory size caused by content of a page image can be prevented.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An image processing apparatus for generating a plurality of pixel rows each having a predetermined width, the image processing apparatus comprising:
   a unit, including at least one processor, configured to function as:
   a first generation unit configured to generate a plurality of pieces of span data based on edges of objects included in a page; and
   a second generation unit configured to generate the plurality of pixel rows each having the predetermined width in a first method to generate, from the plurality of pieces of span data, a plurality of sets of span data based on the predetermined width, and to rasterize the plurality of sets of span data one by one,
   wherein the second generation unit is configured to generate the plurality of pixel rows each having the predetermined width in a second method to rasterize the plurality of pieces of span data into a pixel row and to divide the pixel row based on the predetermined width, in accordance with a value relating a data size of an image which corresponds to the generated pieces of span data, and wherein generating the plurality of pixel rows each having the predetermined width in the first method or the second method is determined based on comparison of the value with a predetermined threshold value.

2. The image processing apparatus according to claim 1, wherein the second generation unit is configured to compare the value with the predetermined threshold value, and to generate the plurality of pixel rows each having the predetermined width in the second method when a result of the comparison indicates that the value is larger than the predetermined threshold value.

3. The image processing apparatus according to claim 2, wherein each of the generated pieces of span data includes a predetermined data size of header information, and wherein the second generation unit is configured to calculate the value by summing data sizes of the header information for the generated pieces of span data.

4. The image processing apparatus according to claim 3, wherein each of the generated pieces of span data includes a predetermined data size of identification information for an object which is associated with said each of the generated pieces of span data, and wherein the second generation unit is configured to calculate the value by summing data sizes of the header information and the identification information for the generated pieces of span data.

5. An image processing method for generating a plurality of pixel rows each having a predetermined width, the image processing method comprising: an acquiring step of acquiring a plurality of pieces of span data based on edges of objects included in a page; and a generation step of generating the plurality of pixel rows each having the predetermined width (i) in a first method to generate, from the plurality of pieces of span data, a plurality of sets of span data based on the predetermined width, and to rasterize the plurality of sets of span data one by one, or (ii) in a second method to rasterize the plurality of pieces of span data into a pixel row and to divide the pixel row based on the predetermined width, in accordance with a value relating a data size of an image which corresponds to the generated pieces of span data, wherein generating the plurality of pixel rows each having the predetermined width in the first method or the second method is determined based on comparison of the value with a predetermined threshold value.

6. The image processing method according to claim 5, wherein the generation step includes comparing the value with the predetermined threshold value, and generating the plurality of pixel rows each having the predetermined width in the second method when a result of the comparison indicates that the value is larger than the predetermined threshold value.

7. The image processing method according to claim 6, wherein each of the generated pieces of span data includes a predetermined data size of header information, and wherein the generation step includes calculating the value by summing data sizes of the header information for the generated pieces of span data.

8. The image processing method according to claim 7, wherein each of the generated pieces of span data includes a predetermined data size of identification information for an object which is associated with said each of the generated pieces of span data, and wherein the generation step includes calculating the value by summing data sizes of the header information and the identification information for the generated pieces of span data.

9. A non-transitory computer-readable storage medium which stores a program configured to command a computer to execute an image processing method for generating a plurality of pixel rows each having a predetermined width, the image processing method comprising: an acquiring step of acquiring a plurality of pieces of span data based on edges of objects included in a page; and a generation step of generating the plurality of pixel rows each having the predetermined width (i) in a first method to generate, from the plurality of pieces of span data, a plurality of sets of span data based on the predetermined width, and to rasterize the plurality of sets of span data one by one, or (ii) in a second method to rasterize the plurality of pieces of span data into a pixel row and to divide the pixel row based on the predetermined width, in accordance with a value relating a data size of an image which corresponds to the generated pieces of span data, wherein generating the plurality of pixel rows each having the predetermined width in the first method or the second method is determined based on comparison of the value with a predetermined threshold value.

* * * * *